W. Obenchain,
Cutting Wooden Gearing.
N° 23,484. Patented Apr. 5, 1859.
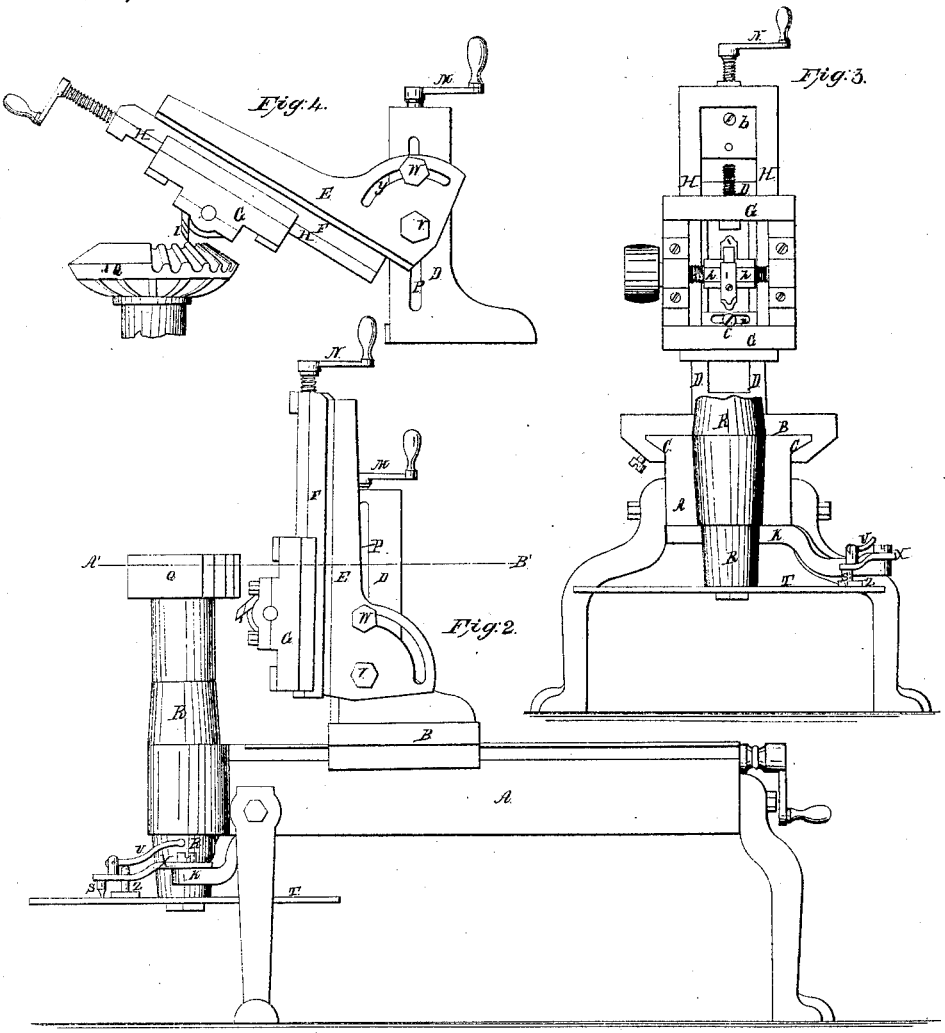
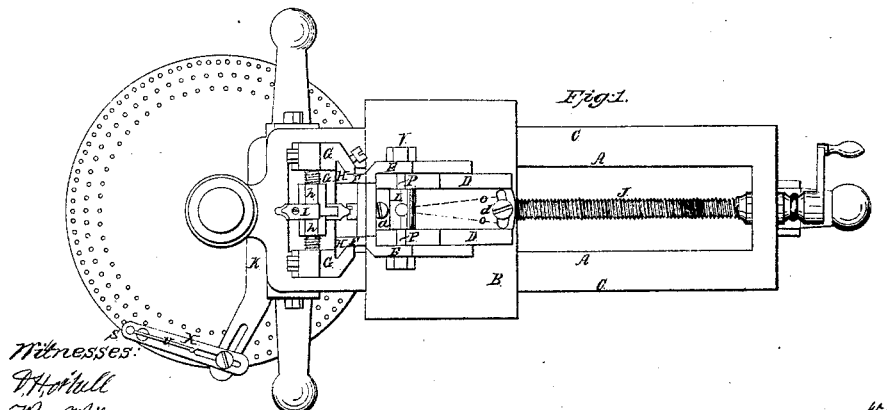
Witnesses:
Inventor:
Washington Obenchain

UNITED STATES PATENT OFFICE.

WASHINGTON OBENCHAIN, OF LOGANSPORT, INDIANA.

MACHINE FOR MAKING WOODEN PATTERNS FOR COG-WHEELS, &c.

Specification of Leters Patent No. 23,484, dated April 5, 1859.

*To all whom it may concern:*

Be it known that I, WASHINGTON OBENCHAIN, of the county of Cass, in the State of Indiana, have invented a new and useful Machine for Cutting and Dressing Cogs on Wooden Patterns; and I do hereby declare that the following is a full, clear, and exact description of the same, reference being had to the annexed drawings, making a part of this specification, in which—

Figure 1 is a horizontal plan or section on line A, B, Fig. 2. Fig. 2 is a longitudinal elevation. Fig. 3 is a lateral elevation. Fig. 4 is a profile of inclined arm and cutter.

Similar letters of reference indicate corresponding parts in the several figures.

A, is the cast-iron bed; B, the slide head which runs back and forth on the track C, by turning the regulating screw J. The upright D, is firmly secured to the slide-head B, by the center bolt $a$, and the set-screw $d$, which works in the slot $f$. The said upright is made to revolve slightly to the right and left and fixed stationary to any required angle as shown in the dotted lines $o$, $o$, Fig. 1. The arms E, are secured to the center bolt L which works up and down in the slot P, by the adjusting screw M. The track-frame F is secured to the arm E, by the screws $b$, $c$, Fig. 3. Said frame is suspended and secured at $b$, and is made to move to the right and left at the bottom, and secured to any required position by the set screw $c$, which works in the curved slot $n$, Fig. 3. The slide-head G, and the cutters I, move up and down on the track H, by turning the feed screw N. The arm E, is made to incline to any required angle and secured in that position by the set-screw W, which works in the slot Y, Fig. 4.

R, Fig. 2, is the mandrel the center of which revolves with the dial-plate T. The spring-holder K, and the spring X, are provided with slots as represented in Fig. 1. At the end of the set-spring X, is a pointed pin S, as seen at Fig. 3, which is forced into small holes in the dial-plate for the purpose of holding it stationary and making the divisions for the cogs. The set-spring is raised by pressing down on the lever U, across the fulcrum Z.

Operation: To make and finish the cogs on a spur-wheel, the wheel Q, is prepared and secured to the mandrel R, Fig. 2. The arm and track inclines back about one degree or sufficient to give a proper draft to the wheel. The upright is then moved up sufficiently near the wheel to cut the full depth of the cog groove, by turning the regulating-screw J. The motion is then given to the cutters, which commences below the wheel and are gradually raised by turning the feed screw M, until they are elevated entirely above the wheel, cutting the full depth of the cog-groove; the feed screw is then reversed and the cutters run down in the same track cleaning and smoothing the groove as they run down to their former position. By forcing down the lever U, the pin or point is raised, and the dial-plate revolved one space for the thickness or space of one cog, thus spacing and dressing the cog at one operation. When it is required to cut dovetails for inserting cogs a small circular saw is used in place of the cutters; the uprights are revolved a little to the right or left in an oblique position as shown by the dotted lines $o$, $o$, Fig. 1 and secured until one side of all the dovetails are cut, then changed to the same opposite angle for the other side. The saw is then removed and a square pointed cutter inserted which cleans out the grooves. To dress cogs on beveled wheels as in Fig. 4 the arms are adjusted to the proper angle and height to suit the face of the beveled wheel when secured to the mandrel as before described. The arm is adjusted by the adjusting screw M, and secured by the screws W, and V. To dress the cogs and grooves tapering the bottom of the track-frame F is moved a little to one side, and secured by tightening the set-screw C, Fig. 3, and retained in that position until one side of all the cogs are dressed. The track-frame is then reversed to the same opposite angle until the other side of all the cogs are dressed with the required taper.

The above described machine is portable and so arranged as to be attached to, and run by a common wood lathe.

What I claim as my invention and desire to secure by Letters Patent is—

1. The mode of adjusting the arm E, vertically, by means of screw M, in combination with the upright D, which is also adjustable about a vertical axis, as and for the purposes set forth.

2. The track frame F, when adjustable laterally for the purpose of giving taper to the piece cut.

3. The arrangement and devices for adjusting the cutters I, as and for the purposes set forth.

WASHINGTON OBENCHAIN.

Witnesses:
D. H. MULL,
WM. WILSON.